United States Patent [19]

Dockery

[11] Patent Number: 5,151,838

[45] Date of Patent: Sep. 29, 1992

[54] VIDEO MULTIPLYING SYSTEM

[76] Inventor: Gregory A. Dockery, 1938 Port La., Amarillo, Tex. 79106

[21] Appl. No.: 409,667

[22] Filed: Sep. 20, 1989

[51] Int. Cl.$^5$ .......................................... H04M 11/04
[52] U.S. Cl. ................................. 340/310 R; 358/86; 340/310 A
[58] Field of Search ...................... 340/310 R, 310 A; 358/86; 455/3, 270; 333/32; 343/876, 905, 861

[56] References Cited

U.S. PATENT DOCUMENTS

| | | | |
|---|---|---|---|
| 2,562,654 | 7/1951 | Williams . | |
| 2,915,627 | 12/1959 | Spindler . | |
| 2,925,598 | 2/1960 | Williams | 343/861 |
| 2,991,355 | 7/1961 | Spindler . | |
| 3,290,601 | 12/1966 | Pinnizotto et al. | 343/905 |
| 3,324,473 | 6/1967 | Fleming . | |
| 3,649,742 | 3/1972 | Tissot | 343/905 X |
| 3,903,706 | 6/1973 | Karplus | 358/86 |
| 3,983,563 | 9/1976 | Nakayama | 343/861 |
| 4,032,723 | 6/1977 | Mendoza | 343/905 X |
| 4,054,910 | 10/1977 | Chou et al. | 358/86 |
| 4,401,989 | 8/1983 | Tulli | 343/905 |
| 4,429,299 | 1/1984 | Kabat et al. | 340/310 R |
| 4,507,646 | 3/1985 | Hamlin et al. | 340/310 R |
| 4,772,870 | 9/1988 | Reyes | 340/310 R |
| 4,912,553 | 3/1990 | Pal et al. | 358/86 |

*Primary Examiner*—Jin F. Ng
*Assistant Examiner*—Brian R. Tumm
*Attorney, Agent, or Firm*—Cushman, Darby & Cushman

[57] ABSTRACT

A VCR transmission device is disclosed including a transmitting unit capable of receiving a VCR video signal, conditioning the video signal and outputting the video signal onto a home power line ordinarily carrying an AC power signal. The transmitting device attaches directly to an existing power outlet in the home power line to deliver the video signal from the VCR throughout the home. A receiving unit is then connected to any other power outlet in the home power line to extract the video signal from the power line and to deliver the signal to a television set which may be remote from the VCR.

26 Claims, 3 Drawing Sheets

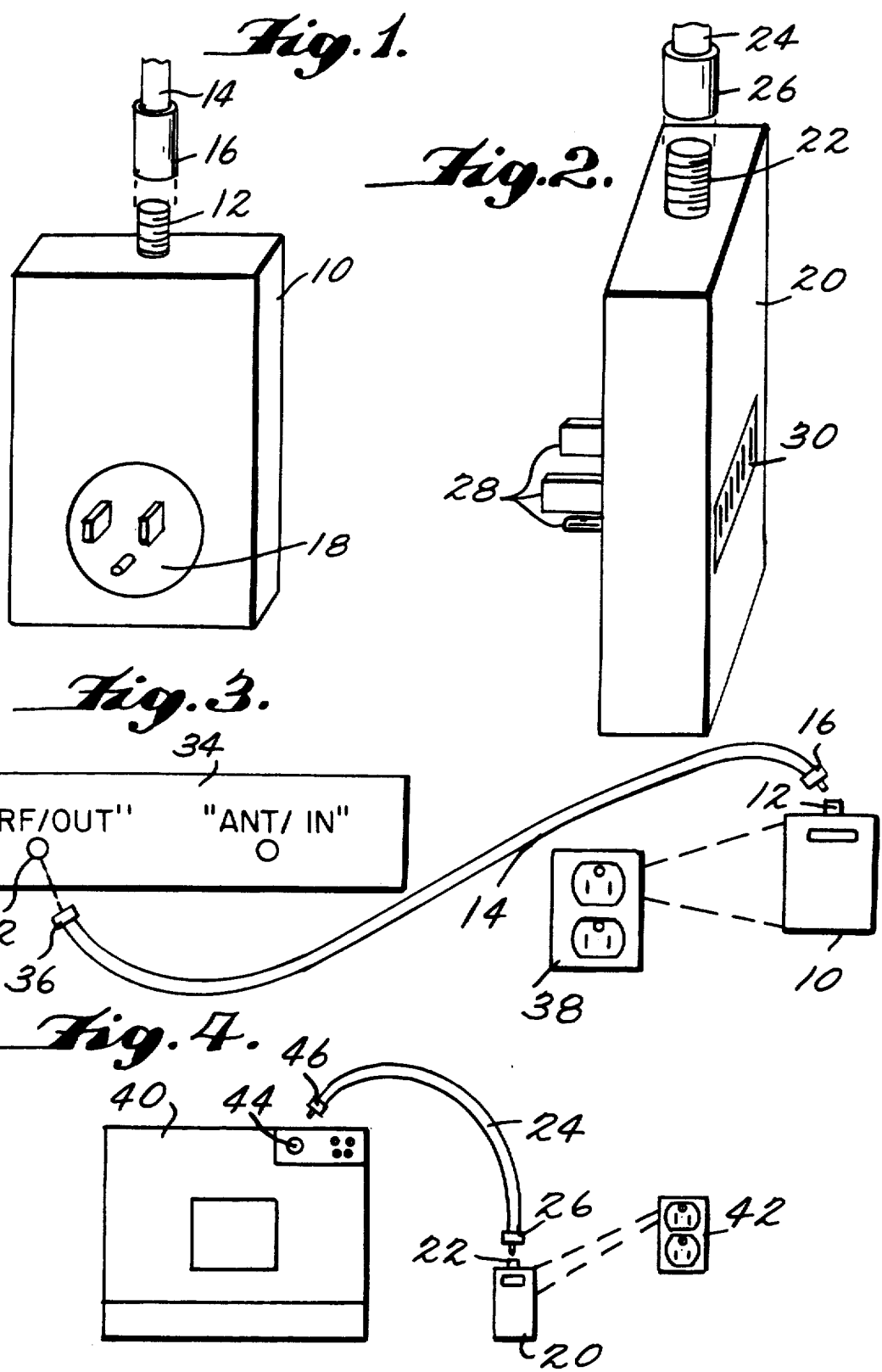

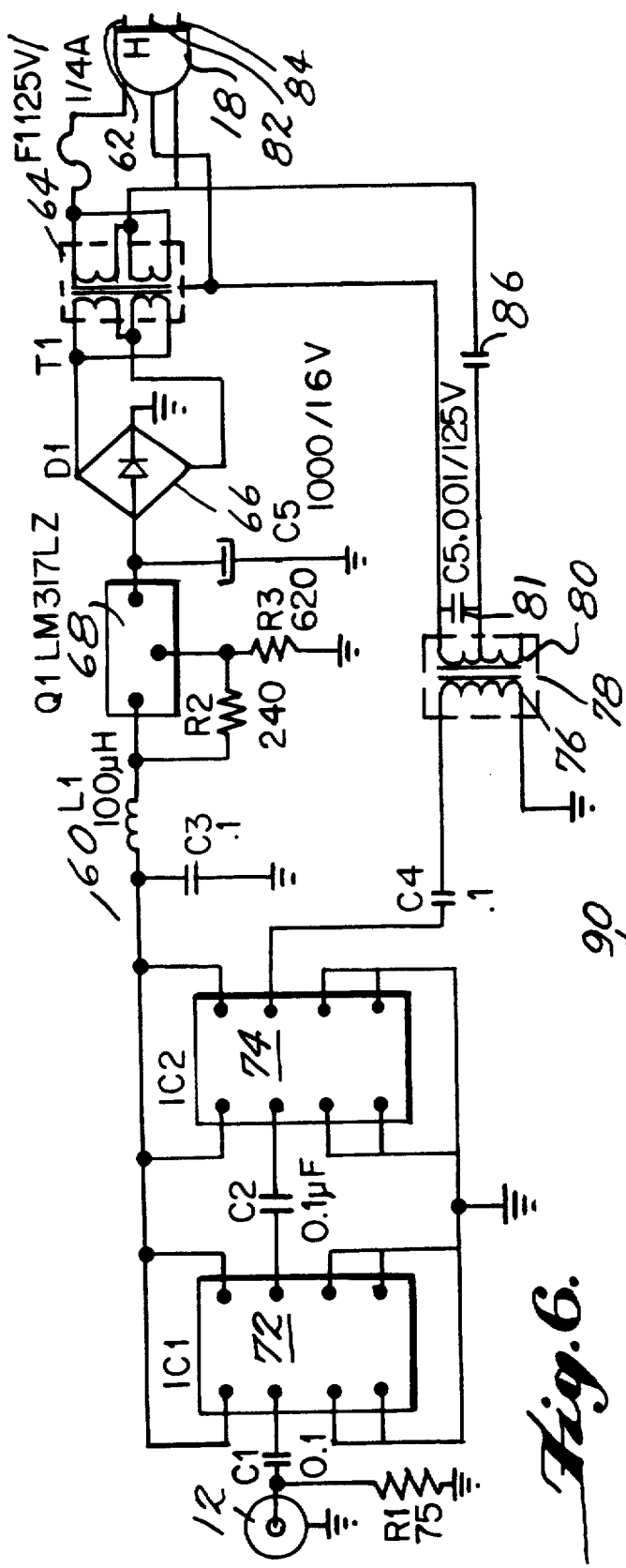
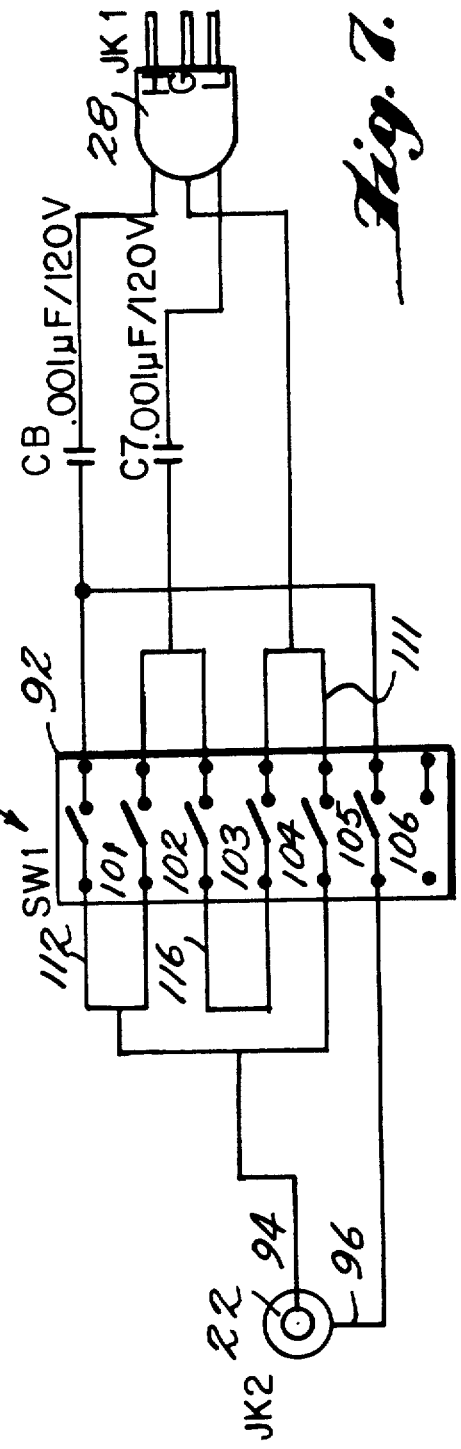
Fig. 6.
Fig. 7.

VIDEO MULTIPLYING SYSTEM

BACKGROUND OF THE INVENTION

1. Field of the Invention

This invention relates to video transmission systems. More particularly, this invention relates to methods and apparatus for multiplying a video signal by transmitting the signal through an AC power line.

2. Description of the Related Art

Various arrangements for multiplying the number of potential receivers of a video signal have been devised. The most common arrangement of multiplying the number of receivers of a particular video source, such as a Video Cassette Recorder (VCR), includes independently wiring the output of the video signal source to each of the desired receivers. In a home environment, for example, the video output of a VCR in one room of the home is independently wired to a television receiver in another room of the home through a coaxial cable extending between the television receiver and the VCR. If the user wishes additional television receivers to receive the VCR video output, the video output of the VCR is coupled via a coaxial cable to a splitter and the respective outputs of the splitter are independently wired to the respective television receivers through a plurality of additional coaxial cables. In such an "independently wired" arrangement, the user is forced to wire the home with a network of coaxial cables to deliver the VCR video output to the various locations in the home where the respective television receivers are situated.

With respect to audio signals from VCRs and other audio signal sources, devices are available which transmit the audio signals through the existing home power line to eliminate the requirement of independently wired connections between the audio signal receivers, such as speakers and intercoms, and the audio signal source. With these devices, the user may plug the audio signal source directly into an existing power outlet through an adapter and may then connect any number of audio signal receivers to the audio signal source by plugging each audio signal receiver into any existing home power outlet through another adapter. While these prior devices connected the audio signal receivers to the audio signal source through the existing home power line, prior attempts to transmit video signals through the existing home power line have been wholly unsuccessful.

While the desirability of transmitting video signals across existing home power lines is a widely sought objective, realization of the goal has been elusive due to numerous problems, including the problem of matching the transmitter and receiver impedances to the impedance on the power line. The impedance on the power line is constantly changing as loads are added to and removed from the power line. The 75 ohm impedance at the VCR output and at the television receiver input will not ordinarily match the impedance on a home power line, since the impedance on the home power line may vary, for example, from 10 ohms to 1000 ohms. Due in part to inadequate impedance matching, signal attenuation caused by the mismatched impedances will substantially diminish the video signal quality and prohibit transmission of the video signal across the home power lines.

Even with respect to prior audio signal transmitters, impedance matching is a significant problem. Since the power line impedance so significantly fluctuates, attenuation of the video signal on the power line is dramatic. To compensate, the prior audio signal transmitters amplified the audio signal to extremely high levels, for example 10 Watts at 100 KHz in a home system, in order to compensate for the expected attenuation loss on the unmatched power line. With respect to a video signal, however, simply boosting the power to a level overcoming the greatest expected attenuation level on the power line is problematic. First, boosting the power level of the video signal results in substantial power consumption, most of which is simply lost on the power line due to video signal attenuation. More importantly, in the event that the power line impedance and the receiver impedance coincidently match, the highly boosted video signal will suffer little attenuation loss on the power line, causing the power line to broadcast the low-attenuation, high-power video signal to potentially distant regions outside of the power line intended to carry the video signal.

SUMMARY OF THE INVENTION

The presently preferred embodiment of the present invention provides an apparatus and method for transmitting video and audio signals across an existing home power line. A VCR signal, including both video and audio signal components, is input to a transmitting unit through a coaxial cable. The transmitting unit conditions the VCR signal for transmission on the power line and transmits the conditioned VCR signal into one of the existing home power outlets.

Once the transmitting unit transmits the VCR signal onto the existing home power line through the power outlet, the VCR signal may be received at any of the remaining home power outlets in the home through a receiving unit which may be tuned to substantially reduce attenuation of the RF signal on the power line and to permit the receiving unit to intercept a low power level RF signal from the power line. The receiving unit then transmits the VCR signal intercepted from the home power line across a coaxial cable to a television, or other video signal receiver. With the transmitting and receiving units of the present invention, the complete VCR signal, including video and audio components, may be transmitted across existing home wiring and may be multiplied for a plurality of receivers for a plurality of power outlets available in the home power line.

BRIEF DESCRIPTION OF THE DRAWINGS

In accordance with the above objects, the present invention is described below with particular reference to the accompanying drawings, in which:

FIG. 1 is a perspective view of a transmitting unit according to one embodiment of the present invention;

FIG. 2 is a perspective view of a receiving unit according to a second embodiment of the present invention;

FIG. 3 is a schematic view of the transmitter connections according to a third embodiment of the present invention;

FIG. 4 is a schematic view of the receiver connections according to a fourth embodiment of the present invention;

FIG. 6 is a schematic diagram of the transmitter circuit according to the first embodiment of the present invention; and FIG. 7 is a schematic diagram of the receiver circuit according to the second embodiment of the present invention.

DETAILED DESCRIPTION OF THE PRESENTLY PREFERRED EMBODIMENTS

Figure 5:
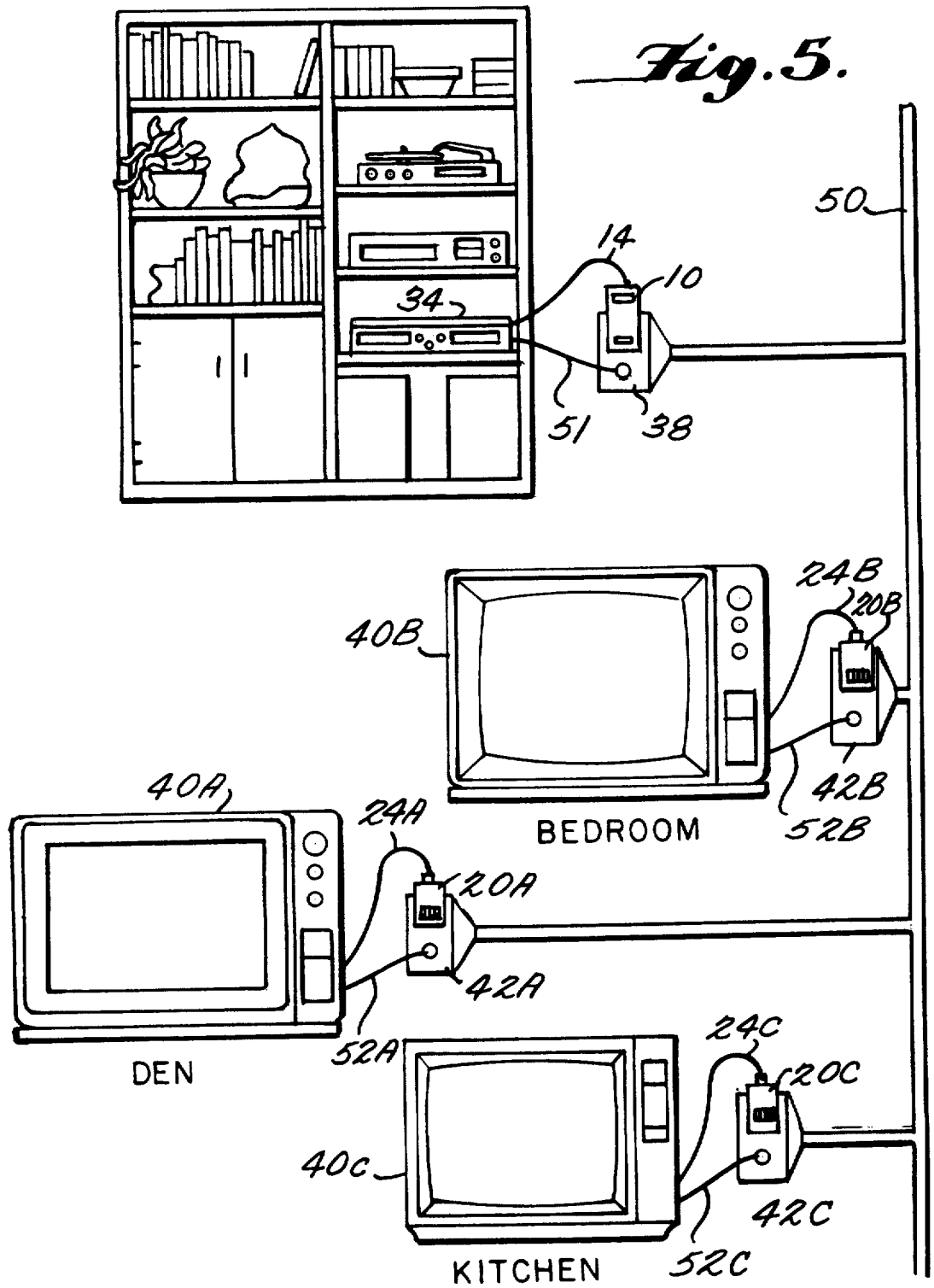
FIG. 5 is a schematic view of the transmitter and receiver connections to a home power line according to a fifth embodiment of the present invention.

The presently preferred embodiment of the present invention provides a transmitter and receiver for coupling an analog video signal into an existing home power line. With the preferred embodiment, for example, a VCR signal output, including audio and video components, may be input to a standard power outlet in one room of a home and output to a television receiver in any room of the home through any other power outlet.

FIG. 1 illustrates a transmitter 10 having a threaded input 12 coupleable to a standard video coaxial cable 14 through a threaded sleeve 16, and having an output 18 comprising a three-prong adapter coupleable to a standard home power outlet. FIG. 2 illustrates a receiver 20 having a threaded output 22 coupleable to a standard video coaxial cable 24 through a threaded sleeve 26 and an input 28 comprising a three-prong adapter coupleable to a standard home power outlet. The receiver 20 also includes a set of single pull switches 30 which are used for impedance matching, as further described below.

FIG. 3 illustrates the transmitter 10 coupling a VCR signal into the home power line. The coaxial cable 14 is connected to the input 12 of the transmitter 10 through the threaded sleeve 16 at one end and is connected to an output 32 of a VCR 34 through a threaded sleeve 36 at the opposite end. The VCR outputs a video signal to the transmitter 10 through the cable 14 and the transmitter 10 processes the video signal and transmits the video signal onto the home power line through an electrical connection between the three-prong output 18 and a first standard home outlet 38.

The transmitter 10 need not be a device which is external to the VCR 34, as shown in FIG. 3, but may be internal to the VCR 34. According to this embodiment, the transmitter 10 would be manufactured integrally with the VCR 34, such that the output 18 of the transmitter 10 would not comprise a three prong adapter, but would comprise a three wire line exiting the body of the VCR and terminating in an external three prong adapter. The separate transmitter unit 10 would thus be integrated into the VCR, eliminating a loose component and reducing the manufacturing costs of the transmitter. An AC power cable, supplying power from the AC power line to the VCR, may be combined with the video signal line, supplying the video signal from the VCR onto the power line, so only one line between the outlet 38 and the VCR would be required. Of course, if desired, two separate lines, one for delivering AC power to the VCR and transmitter, and the other for delivering the video signal to the power line, may be used with the outlet 38.

As used throughout the specification and claims, the term "power line" refers to one or more electrical conductors which are connected to an AC power generator and ordinarily distribute an AC power signal. While one embodiment of the power line, namely the power line located in a home, is described in this specification, the power line is not limited to those located within a home or any other physical structure, but may be any electrical conductor ordinarily carrying an AC power signal. The term "electrical connection" as used throughout the specification and claims means a state in which one location is capable of communicating a signal to another location and may be, for example, a physical connection through a conductor, a broadcast connection, or an optical connection.

FIG. 4 illustrates the receiver 20 coupling the VCR signal from the home power line into a television receiver 40. After the transmitter 10 has transmitted the VCR signal onto the home power line, as described above, the receiver 20 taps the VCR signal from the home power line through an electrical connection between the three-prong input 28 and a second standard home outlet 42. The transmitter then outputs the VCR signal to the television receiver 40 through the coaxial cable 24. The coaxial cable 24 is connected to the output 22 of the receiver 20 through the threaded sleeve 26 at one end and is connected to a 75 ohm input 44 of the television receiver 40 through a threaded sleeve 46 at the opposite end.

The receiver may be combined integrally in the television to eliminate the receiver as a loose component. With this embodiment, the television may have two cables connecting the television to the outlet 42, namely a video signal line and an AC power line, or the two cables may be combined into a single cable simultaneously supplying AC power to the television and the video signal to the receiver.

The entire power line, transmitter, and receiver arrangement is illustrated in FIG. 5. The video signal is generated by the VCR 34 and is output to the transmitter 10, which is electrically connected to the outlet 38 through the three-prong adapter output 18. The transmitter 10 processes the video signal and outputs the video signal onto the home power line 50 where it is delivered to every other outlet 42A-42C throughout the home. The VCR is powered through a standard AC power cable 51. Receivers 20A-20C are electrically connected to the outlets 42A-42C, respectively. Each receiver 20A-20C taps the video signal from the home power line 50 through the outlets 42A-42C and outputs the video signal to television receivers 40A-40C through coaxial cables 24A-24C, respectively. The television receivers 40A-40C are powered through standard AC power cables 52A-52C. With this arrangement, a single VCR outputs a VCR signal which may then be received by one or more television receivers situated at any location in the home where a power outlet is available.

The circuit structure of the transmitter is described with particular reference to FIG. 6. The transmitter circuit 60 is powered by the 125 VAC power at the outlet 38, which is connected to the transmitter circuit through the three-prong adapter at the transmitter output 18. The high side AC connector 62 is input to a transformer 64 and bridge network 66. The bridge network rectifies the 125 VAC signal and outputs the rectified signal through a voltage regulator 68, which outputs a DC voltage to power the transmitter circuitry.

The VCR signal is input to the transmitter circuit 60 through the coaxial cable input 12. The cable input 12 is capacitively coupled into a first amplifier 72, which is capacitively coupled to a second amplifier 74. The amplifiers may be coupled in series, may be piggy-backed, or may be cascaded.

The amplifiers are RF amplifiers and have an input impedance of 75 ohms, provide a minimum gain of approximately 16 dB, and have a wide band-width at high frequencies, including at least 63 MHz. Alternatively, a single high-gain amplifier may replace the first and second amplifiers 72 and 74. The amplifier gain may be increased or decreased from the above example depending on the gain required for the particular application and on the input impedance required for the particular application.

The analog VCR signal is input to the amplifiers, which output the VCR signal to the primary coil 76 of a transformer 78. The secondary coil 80 of the transformer 78 is connected to the three prong adapter and transmits the video signal directly onto the power line. The secondary coil 80 is grounded to a ground line which is independent of the ground used by the VCR input cable 12. In the embodiment shown in FIG. 6, the coil uses the earth ground line 82 of the adapter output 18 as a reference. The secondary coil may be connected to alternative ground references, other than the earth ground of the adapter output 18, such as to the AC power outlet box 38 or to a ground plane provided by the VCR.

In the embodiment of FIG. 6, the secondary coil transmits the video signal between the neutral line 84 and the common line 82. As the video signal travels down the neutral line 84 of the power line 50, an electromagnetic field is generated between the neutral, common and high side lines of the power line. For example, the neutral line is a carrier of the video signal with the common line 82 acting as an antennae to the neutral line. Similarly, the common line 82 is a carrier with the neutral line acting as an antennae to the common line 82. Finally, the high line 62 is not directly connected to the secondary coil 80 at the transmitter circuit 60 and thus does not directly obtain the video signal from the VCR, but does act as an antennae to both the common and the neutral lines and acts as an antennae tuning wire to the neutral line 84 and the common line 82. Accordingly, at the receiver 20, the video signal may be received from the neutral line 84 as a carrier of the video signal or as an antennae for the common, from the common line 82 as a carrier or as an antennae for the neutral line, or from the high line 62 as an antennae for the neutral line 84 or an antennae for the common line 82. The selection of antennae lines and carrier lines from the above combinations is made at the receiver, as described below.

The preferred impedance at the secondary coil 80, for a typical home power line, is 246 ohms. The matching transformer 78 is, therefore, designed to provide 246 ohms at the output of the secondary coil 80. A capacitor 81 is provided in parallel with the secondary coil 80 to tune the RF signal output by the transmitter to the center frequency of the channel onto which the video signal is transmitted. For example, if the transmitter is used on broadcast Channel 3, which is located between 60.5 MHz and 65.5 MHz, the capacitor 81 may be a 39 pFd capacitor to tune the RF signal to 63 MHz. Alternatively, the transmitter may be used on any frequency by adjusting the value of the capacitor 81 to tune the frequency to the desired centerpoint. For example, the transmitter may be tuned to any of the television broadcast frequencies: 54–72 MHz, 76–88 MHz, 174–216 MHz, or 470–806 MHz.

The transformer is designed to tune the input impedance of the video signal being input to the power line to a central value between the high and low impedances anticipated on the home power line. Since the impedance on the power line is constantly changing as loads are added to and deleted from the power line, the input impedance of the transmitter 10 typically will not perfectly match the constantly varying impedance on the power line. In the transmitter 10, however, the transformer 78 is tuned to an average value between the anticipated high and low impedances occurring on the power line. For a typical home, for example, the load impedance on the power lines may range from 10 ohms to 500 ohms, for which, the transformer 78 may be tuned to the average, 255 ohms on the output of the transformer. With this tuned transformer, the maximum potential impedance difference between the transmitter and the power line is approximately ±245 ohms. This difference in impedance between the output of the tuned transformer 78 and the power line is tolerable in view of the impedance matching result achieved by the receiver 20, as described below. In fact, the tuned impedance on the output of the transformer need not be the average value between the minimum and maximum anticipated impedance values on the power line, but may be any impedance value within the range of minimum and maximum impedance values.

As shown in FIG. 7, each receiver 20 includes a receiver circuit 90 which intercepts the radiated VCR signal from the power line, through a three-prong adapter input 28. The impedance at the receiver may be adjusted using through a switching circuit 92 comprising a series of DIP switches 30. The switches need not be single pull switches, as shown in FIG. 7, but may be any device capable of signal selection.

By adjusting the switches of FIG. 7, the video signal propagating on the power line is picked off of either the board ground line, the common line, the high side AC line (by capacitive coupling), the neutral line (by capacitive coupling), or any combination of two, three or all of the above lines simultaneously. While the FIGURES illustrate the present invention used with a three prong AC outlet having a high side AC line, a neutral line, and a common line, the present invention may be used with a two prong AC outlet by electrically connecting the earth ground lines in the present circuits to an independent ground return line, such as to the outlet box itself. The output of the transmitter simply requires a large ground, independent of the ground used by the 75 ohm input from the VCR. The earth ground is one alternative for a large, independent ground. If the transmitting unit of the present invention is made integral with the VCR, as described above, the ground return line may be a board ground or a RF ground within the VCR itself, rather than being the earth ground wire of the AC outlet.

The output line 94 of the receiver is connected to switches 101, 102, and 105 at the switch circuit 92 and load impedances are added to the output line by closing single DIP switches 30 or combinations of DIP switches 30. As different combinations of the DIP switches are closed, the signal level of the radiated video signal at the three-pronged adapter 28 is unchanged but the impedance at the receiving unit is altered, adjusting the video signal attenuation caused by unmatched impedances between the receiver and the power line. By trial, a preferable combination of closed and opened switches 30 may be obtained to adequately match the impedance at the receiver to the impedance on the power line.

The following combinations of closed switches 101-106 may be used to match the impedance at the receiver to the impedance on the power line (where "1" refers to closing switch 101, "2" refers to closing switch 102, etc.):

| 1. 1 | 18. 36 | 35. 246 |
|---|---|---|
| 2. 2 | 19. 45 | 36. 345 |
| 3. 3 | 20. 46 | 37. 346 |
| 4. 4 | 21. 56 | 38. 456 |
| 5. 5 | 22. 123 | 39. 1234 |
| 6. 6 | 23. 124 | 40. 1235 |
| 7. 12 | 24. 125 | 41. 1236 |
| 8. 13 | 25. 126 | 42. 1245 |
| 9. 14 | 26. 135 | 43. 1246 |
| 10. 15 | 27. 136 | 44. 1345 |
| 11. 16 | 28. 145 | 45. 1346 |
| 12. 23 | 29. 146 | 46. 2345 |
| 13. 24 | 30. 156 | 47. 2346 |
| 14. 25 | 31. 234 | 48. 3456 |
| 15. 26 | 32. 235 | 49. 12345 |
| 16. 34 | 33. 236 | 50. 12346 |
| 17. 35 | 34. 245 | 51. 12356 |
|  |  | 52. 123456 |

The impedance on the power line may vary dramatically between different power lines. By adjusting the switches throughout the above combinations, the impedance at the receiving unit may be substantially matched to the particular conditions of the power line in a particular home. In addition, the switches adjust the particular line (or combination of lines), including the high side AC, neutral, common, and board ground lines, from which the receiving unit will intercept the video signal.

By closing switch 101, the output line 94 receives the video signal directly from the high side power line "H". The connections between the output line 94 and the switches 102 and 105 tune the receiver output line to a particular impedance by bringing the video signal carrier at switch 101 closer to the ground line at switch 106.

By closing switch 102, the output line 94 receives the video signal directly from the neutral line "L". Although switches 101, 103, 105 and 106 are all closed, these switches still tune the impedance of the receiver by adjusting the proximity of the video signal carrier at switch 102 relative to the ground lines. For example, although the video signal is delivered to the output line 94 through the closed switch 102, the wire connecting switch 102 and 103 connects the input of switch 102 to a point closer to the ground line at switch 106. Similarly, the lines connecting switches 101 and 105 connect the video signal carrier at switch 102 closer to the ground line at switch 106.

The two examples above teach that, while the closed switches carrying the video signal to the output line 94 are important in determining the impedance at the receiver, the status of the remaining switches on the receiver circuit are equally important in providing flexibility to tune the impedance at the receiver to substantially match the impedance on the power line.

By closing switch 103, the video signal on the high, neutral, and ground lines of the adapter 28, are not input directly into the output line 94. Instead, the video signal on the neutral line "L", passes through switch 103 and terminates at an open line at switch 104. The loop connection 110 between switches 103 and 104, through which the video signal travels, acts as a loop antennae, which effectively broadcasts the video signal in the vicinity of the switching circuit 92. The broadcasted video signal is picked up by loop 111, between switches 104/105, and loop 112, between switches 101/102. After picking up the radiated broadcast signal from loop 110, loop 112 outputs the video signal onto the output line 94 of the cable 22.

A similar situation exists when switch 104 is closed. With switch 104 closed, the video signal is output from the earth ground line "G" of the adapter 28 through switch 104 and through loop 110 to a termination at the opened switch 103. Loop 110 then broadcasts the video signal in the vicinity of the switching circuit 92. The broadcasted video signal is picked up by loops 111 and 112, and is output to the output line 94 by loop 112.

The examples above relating to the closed switches 103 and 104 illustrate that the impedance of the receiver may be changed by isolating the input lines to the switching circuit and broadcasting the video signal from one antennae on the switching circuit to another antennae on the switching circuit.

By closing switch 105, the output line 94 receives the video signal directly from the earth ground line "G".

Finally, by closing switch 106, the return line 96 is directly connected to the high side power line "H". The video signal then travels down the length of the return line 96, along which, the video signal is broadcast to the output line 94, within the cable 22. The output line 94 picks up the broadcasted video signal from the return line 96 and inputs the video signal to the television receiver.

Note that the cable 22 typically will terminate in a matching transformer in the television, where the return line 96 will be grounded to the earth ground and the output line 94 will be passed to the television circuitry. When the video signal on the return line 96 reaches the earth ground on the matching transformer of the television, the video signal on the return line 96 will be grounded and lost. However, the travel of the video signal along the return line 96 to the earth ground at the television transformer will sufficiently broadcast the video signal to the output line 94 and to the primary coil of the matching transformer of the television, before the video signal is lost on the return line at the matching transformer.

The length of the coaxial cable 22 is preferably 46 13/16" when the transmitting unit transmits on broadcast channel 3, 63 MHz. The length of the coaxial cable 22 may be greater or less than 46 13/16", even at 63 MHz, and may be, for example, 60" to adequately permit the video signal to be broadcast from the return line 96 to the output line 94 before the return line 96 is grounded at the matching transformer of the television.

The six examples above thus illustrate various methods available, using the present receiver, for receiving the video signal from the power lines and delivering the video signal to the television receiver, while reducing the attenuation losses in the power line. Various combinations of closed switches will provide additional changes in the impedance at the receiver as alternative methods of matching the impedance on the power line.

In the embodiment of FIG. 6, six switches are provided to tune the impedance of the receiver to the impedance of the power line. The range of impedances which are possible at the receiver is directed by the circuit configuration of the switches at the receiver and the number of switches (and thus the number of selectable combinations) provided at the receiver. Thus, for example, if the receivers are used on power lines which have anticipated loads between 250 ohms and 1000 ohms, the receiver switches may be designed to tune the receivers to between 250 ohms and 1000 ohms to substantially match the impedances at the respective power lines. The present invention is thus not limited to the six switches shown in FIG. 7, nor is the present invention limited to the circuit configurations shown in FIG. 7, but includes any number of switches and any type of circuit configurations necessary to tune the receivers to the types of power lines with which the receiver will be used. Thus, if the power lines have anticipated impedances between 10 ohms and 10,000 ohms, the receivers may be designed in the manner taught by the present invention to tune the receivers to between 10 ohms and 10,000 ohms and to reduce the attenuation of the RF signal on the power line. Regardless of the power line loads, the present receiver is adaptable to switch to a load within the load range of the power line.

The receiver may also be reduced to a fewer number of switches. For example, a receiver with three switches is possible if the video signal enters the switching circuit of FIG. 7 through only two wires, the neutral line "L" and the common line "G". In this embodiment, the neutral line is attached to a first switch 103, as shown in FIG. 7, and the common line is attached to two additional switches 104 and 105, as shown in FIG. 7. The output of switch 103 is connected to the output of switch 104, as shown in FIG. 7, and the output of switch 105 is connected to the output line 94. The return line 96 is connected to ground, as in FIG. 7, and is brought proximate to the switches 103, 104 and 105. With just this three switch circuit, the impedance of the receiver output may be adjusted within a range dictated by the positions of the switches. Of course, greater flexibility in adjusting the impedances of the receiver output is provided by an increased number of switches and switch configurations, yet even the three switch circuit provides some flexibility in tuning the receiver to match the power line impedance.

As shown in the chart above, various combinations of the six switch circuit connections will also deliver the video signal to the output line 94 and also will provide leeway in adjusting the impedance at the receiver unit to match the impedance on the home power line to reduce attenuation of the video signal at the receiving unit.

Although single coupling capacitors are shown in series with the high and low side lines, "H" and "L", respectively, of FIG. 7, at least two coupling capacitors should be used as a precaution against the occurrence of a short in one of the capacitors. The same is true for the coupling capacitor 86 on FIG. 6.

While the invention has been described in connection with a 125 VAC power line, the invention is not limited to a 125 VAC power line, but may be adapted for use with any AC voltage level.

While coaxial cables are preferred to deliver the video signals from the video signal source to the transmitter unit and from the receiver unit to the television receiver, any known manners of transmitting the video signals between the video signal source, the transmitter unit (whether integral with or external to the video signal source), the power line, the television receiver, and the receiving unit (whether integral with or external to the television unit) may be appropriate alternatives to the coaxial cable.

The present invention is not limited to transmitting VCR signals, but may be used to transmit any video signal, any audio signal, or any combination of video and audio signals. The transmitter may be used to transmit cable television signals across the power line, and may be integral with a cable television tuner or a cable television converter. In addition, the receiver of the present invention may be used to pick up broadcast television, without the assistance of the transmitter. For example, with the arrangement shown in FIG. 5, the VCR 34 and transmitter 10 may be detached from the power line 50. This isolates the television receivers 40A-40C from the VCR 34. Then, if the user of television 40A wishes to receive a particular television broadcast channel, the user sets the television to the particular channel and adjusts the switches 101-106, in the switching circuit 92 to alter the impedance at the receiver to tune the television to the desired broadcast channel using the power lines as antennae. By altering the switches 101-106, the user effectively tunes the television channel reception using the receiver as an alternative to an aerial antennae to tune into an aerial broadcast signal. Thus, the receiver alone, without the television or the transmitting unit, has independent value as an advantageous replacement for aerial broadcast reception at any broadcast frequency.

While the applicant has described the present invention in what the applicant considers the most practical, preferred embodiments, the applicant does not limit the present invention to the disclosed embodiments, but, on the contrary, intends the invention to cover various modifications and equivalent arrangements included within the spirit and scope of the appended claims.

What is claimed is:

1. A receiver for processing a video signal from a power line, comprising:
   three input lines connected to a standard power adaptor, at least one input line carrying the video signal;
   two output lines;
   a processing means comprising conductive elements including switching means and arrangements of conductive paths in which
   1) a first of said three input lines is connected to said switching means by multiple branch lines,
   2) the second and third of said three input lines are connected to said switching means by multiple branch lines,
   3) a first of said two output lines is connected to said switching means by multiple branch lines,
   4) the second of said two output lines is connected to said switching means,
   the switching means facilitates the selection of alternates of said conductive paths and said conductive elements to pass the video signal from the at least one input line carrying the video signal to at least one of said output lines thereby tuning the impedance of the receiver, and
   the processing means enables the simultaneous electrical connection via said conductive elements of one of the output lines with two of the input lines.

2. The receiver of claim 1, wherein, the processing means enables the simultaneous electrical connection via certain of said conductive elements of one of the output lines with the three input lines.

3. The receiver of claim 1, wherein the processing means electrically connects via certain of said conductive elements the first input line with the second input line.

4. The receiver of claim 3, wherein the processing means also electrically connects via certain of said conductive elements the second input line with third input line.

5. The receiver of claim 1, wherein the processing means enables the electrical connection via certain of said conductive elements of at least one of the output lines with each of the three input lines.

6. The receiver of claim 1, wherein the processing means enables the electrical connection via certain of said conductive elements of each of the output lines with each of the three input lines.

7. The receiver of claim 1, wherein the processing means enables the electrical connection via certain of said conductive elements of the first output line with each of the input lines and also enables the electrical connection via certain of said conductive elements of the second output line with each of the input lines.

8. The receiver of claim 1, wherein, the processing means enables, by a first setting of the switching means, the first output line to be electrically connected via certain of said conductive elements simultaneously with two of the input lines and also enables, by a second setting of the switching means, the second output line to be electrically connected via certain of said conductive elements simultaneously with two of the input lines.

9. The receiver of claim 1, wherein the first and second output lines are connected to a coaxial cable coupler with the first output line connected to the internal (signal) line of the coupler and the second output line connected to the external (return) line of the coupler, and wherein the processing means enables the electrical connection via certain of said conductive elements of the second output line with at least one of the input lines while the first output line is not electrically connected via certain of said conductive elements to any of the input lines.

10. The receiver of claim 9, wherein, the processing means enables the electrical connection via certain of said conductive elements of the first output line with at least one of the input lines while the second output line is not electrically connected via said conductive elements to any of the input lines.

11. The receiver of claim 1, wherein the processing means
enables the simultaneous electrical connection via certain of said conductive elements of one of the output lines with two of the input lines,
electrically connects via certain of said conductive elements the first input line with the second input line, and
enables the electrical connection via certain of said conductive elements of each of the output lines with each of the three input lines.

12. The receiver of claim 11, wherein the processing means enables, by a first setting of the switching means, the first output line to be electrically connected via certain of said conductive elements simultaneously with two of the input lines and also enables, by a second setting of the switching means, the second output line to be electrically connected via certain of said conductive elements simultaneously with two of the input lines, and
wherein the first and second output lines are connected to a coaxial cable coupler with the first output line connected to the internal (signal) line of the coupler and the second output line connected to the external (return) line of the coupler,
wherein the processing means enables the electrical connection via certain of said conductive elements of the second output line with at least one of the input lines while the first output line is not electrically connected via said conductive elements to any of the input lines, and
wherein the processing means enables the electrical connection via certain of said conductive elements of the first output line with at least one of the input lines while the second output line is not electrically connected via said conductive elements to any of the input lines.

13. A receiver for processing a video signal from a power line, comprising:
at least two input lines connected to a standard power adaptor, at least one input line carrying the video signal;
two output lines;
a processing means comprising conductive elements including switching means and arrangements of conductive paths in which
1) a first of said at least two input lines is connected to said switching means by multiple branch lines,
2) a second of said at least two input lines is connected to said switching means by multiple branch lines,
3) a first of said two output lines is connected to said switching means by multiple branch lines,
4) the second of said two output lines is connected to said switching means, and
the switching means facilitates the selection of alternates of said conductive paths and said conductive elements to pass the video signal from the at least one input line carrying the video signal to at least one of said output lines thereby tuning the impedance of the receiver, and
the processing means enables the electrical connection via certain of said conductive elements of the first output line with each of the first and second input lines and also enables the electrical connection via certain of said conductive elements of the second output line with each of the first and second input lines.

14. The receiver of claim 13, wherein,
the processing means enables, by a first setting of the switching means, the first output line to be electrically connection via certain of said conductive elements simultaneously with two of the input lines and also enables, by a second setting of the switching means, the second output line to be electrically connected via certain of said conductive elements simultaneously with two of the input lines.

15. The receiver of claim 13, wherein,
the first and second output lines are connected to a coaxial cable coupler with the first output line connected to the internal (signal) line of the coupler and the second output line connected to the external (return) line of the coupler, and
wherein the processing means enables the electrical connection via certain of said conductive elements of the second output line with at least one of the input lines while the first output line is not electrically connected via certain of said conductive elements to any of the input lines.

16. The receiver of claim 15, wherein,
the processing means enables the electrical connection via certain of said conductive elements of the first output line with at least one of the input lines while the second output line is not electrically connected via certain of said conductive elements to any of the input lines.

17. The receiver of claim 16 wherein, the processing means enables, by a first setting of the switching means, the first output line to be electrically connected via certain of said conductive elements simultaneously with two of the input lines and also enables, by a second setting of the switching means, the second output line to be electrically connected via certain of said conductive elements simultaneously with two of the input lines.

18. A receiver for processing a video signal from a power line, comprising:

at least a first and a second input line connected to a standard power adaptor, at least one input line carrying the video signal;

first and second output lines;

a coaxial cable coupler; and a processing means comprising conductive elements including switching means and arrangements of conductive paths in which 1) the input lines are connected to the switching means by the conductive elements including the arrangements of said conductive paths,
2) the output lines are connected to the switching means by the conductive elements including the arrangement of said conductive paths,
3) the output lines are connected to the coaxial cable coupler,
4) the processing means enables the first output line to be electrically connected via certain of said conductive elements with each of the first and second input lines and also enables the second output line to be electrically connected via certain of said conductive elements with each of the input lines, and the switching means facilitates the selection of alternates of said conductive paths and said conductive elements to pass the video signal from the at least one input line carrying the video signal to at least one of said output lines thereby tuning the impedance of the receiver.

19. The receiver of claim 18, wherein, the processing means enables, by a first setting of the switching means, the first output line to be electrically connected via certain of said conductive elements simultaneously with two of the input lines and also enables, by a second setting of the switching means, the second output line to be electrically connected via certain of said conductive elements simultaneously with two of the input lines.

20. The receiver of claim 19, wherein, the first and second output lines are connected to said coaxial cable coupler with the first output line connected to the internal (signal) line of the coupler and the second output line connected to the external (return) line of the coupler, and wherein the processing means enables the electrical connection via certain of said conductive elements of the second output line with at least one of the input lines while the first output line is not electrically connected via certain of said conductive elements to any of the input lines.

21. The receiver of claim 20, wherein, the processing means enables the electrical connection via certain of said conductive elements of the first output line with at least of the input lines while the second output line is not electrically connected via certain of said conductive elements to any of the input lines.

22. A receiver for processing a video signal from a power line, comprising:

at least a first and a second input line connected to a standard power adaptor, at least one input line carrying the video signal;

first and second output lines;

a processing means comprising conductive elements including switching means and arrangements of conductive paths in which 1) the input lines are connected to the switching means by the conductive elements including the arrangements of the conductive paths,
2) the output lines are connected to the switching means by the conductive elements including the arrangements of the conductive paths,
3) the processing means enables the first output line to be electrically connected via certain of said conductive elements with each of the input lines, and also enables the second output line to be electrically connected via certain of said conductive elements with each of the input lines, the switching means facilitates the selection of alternates of said conductive paths and said conductive elements to pass the video signal from the at least one input line carrying the video signal to at least one of said output lines thereby tuning the impedance of the receiver.

23. The receiver of claim 22, wherein, the processing means enables, by a first setting of the switching means, the first output line to be electrically connected via certain of said conductive elements simultaneously with two of the input lines and also enables, by a second setting of the switching means, the second output line to be electrically connected via certain of said conductive elements simultaneously with two of the input lines.

24. The receiver of claim 23, wherein, the first and second output lines are connected to a coaxial cable coupler with the first output line connected to the internal (signal) line of the coupler and the second output line connected to the external (return) line of the coupler, and wherein the processing means enables the electrical connection via certain of said conductive elements of the first output line with at least one of the input lines while the second output line is not electrically connected via certain of said conductive elements to any of the input lines.

25. The receiver of claim 24, wherein, the processing means enables the electrical connection via certain of said conductive elements of the first output line with at least one of the input lines while the second output line is not electrically connected via certain of said conductive elements to any of the input lines.

26. A receiver, comprising:

six switches having input ends and output ends;

an output having an output line and a return line, the return line connected to a ground;

three conducting lines of a power line, the first conducting line connected to the input of the first switch and the input of the sixth switch, the second conducting line connected to the input of the fourth switch and the input of fifth switch, the connection between the input of the fourth switch and the input of the fifth switch forming a first loop, the third conducting line connected to the input of the second switch and the input of the third switch, the connection between the input of the second switch and the input of the third switch forming a second loop, the output of the first switch and the output of the second switch connected together to form a third loop and connected to the output line, the output of the third switch and the fourth switch connected together to form a fourth loop, the output of the fifth switch connected to the output line, and the output of the sixth switch connected to the return line, whereby the impedance of the output line may be adjusted by closing one or more of the six switches.

* * * * *